Patented May 12, 1925.

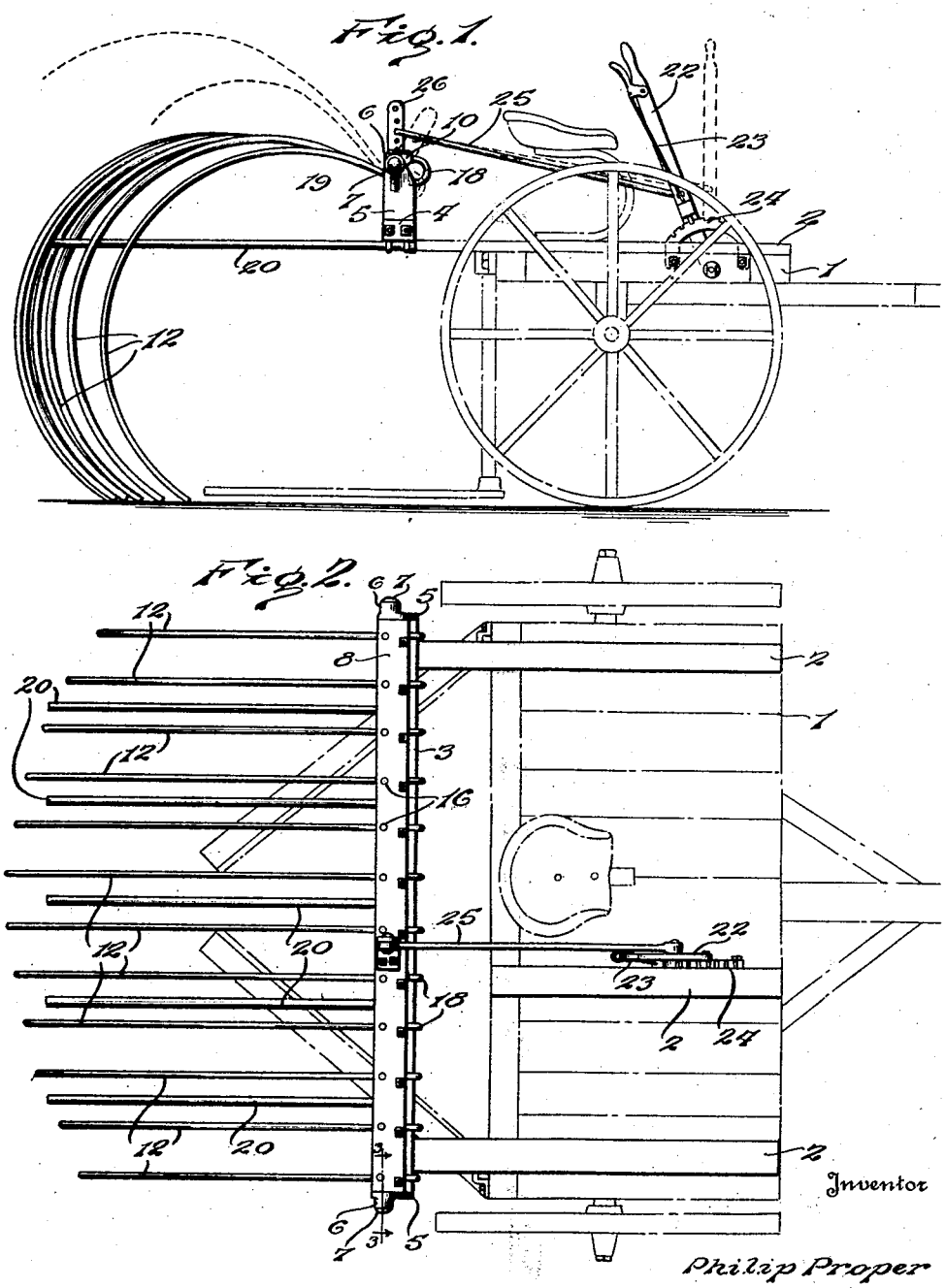

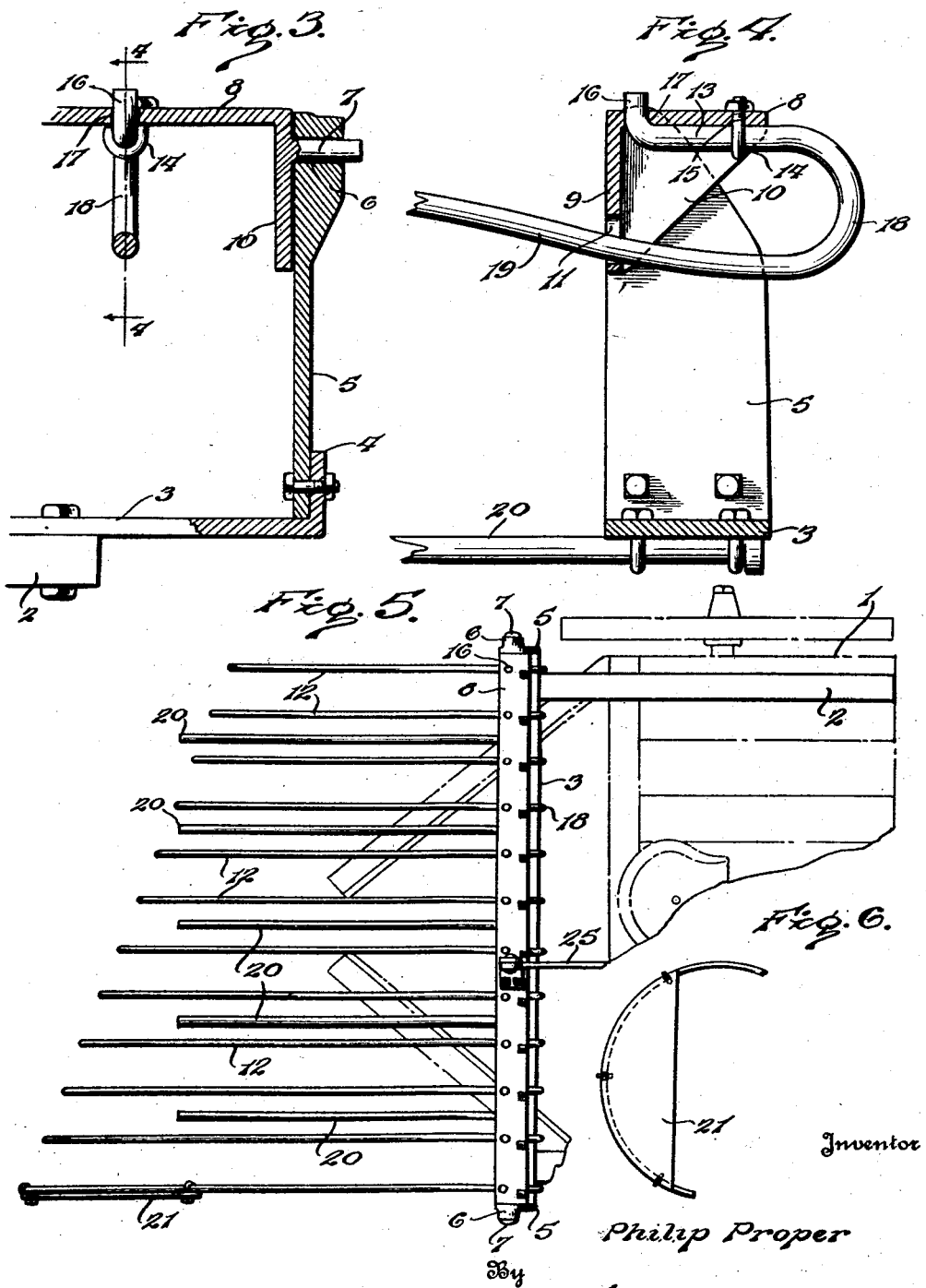

1,537,618

UNITED STATES PATENT OFFICE.

PHILIP PROPER, OF PIGEON, MICHIGAN.

ATTACHMENT FOR BEAN HARVESTERS.

Application filed February 12, 1924. Serial No. 692,336.

*To all whom it may concern:*

Be it known that I, PHILIP PROPER, a citizen of the United States, residing at Pigeon, in the county of Huron and State of Michigan, have invented certain new and useful Improvements in Attachments for Bean Harvesters, of which the following is a specification.

The object of this invention is to provide a simple and inexpensive device which may be easily mounted upon the frame of a bean harvester and which will operate efficiently to gather the cut vines into bundles or shocks which may be subsequently gathered for delivery to a threshing machine. A secondary object of the invention is to provide a construction whereby the vine-gathering elements may be adjusted to meet the requirements of any given circumstances and to so mount said elements that they will readily yield to an immovable obstruction so as to ride over and clear the same without causing breakage to any of the parts. The invention is illustrated in the accompanying drawing and will be hereinafter fully set forth.

In the drawing:

Figure 1 is a side elevation of my attachment showing the same in its operative position;

Fig. 2 is a plan view of the same;

Fig. 3 is an enlarged detail section on the line 3—3 of Fig. 2;

Fig. 4 is a section on the line 4—4 of Fig. 3;

Fig. 5 is a plan view showing a variation in the arrangement of the rake teeth;

Fig. 6 is a detail end elevation of a portion of the device shown in Fig. 5.

The bean harvester may be of any well-known or preferred construction and is illustrated conventionally only. In carrying out my invention, I secure upon the frame 1 of the bean harvester longitudinally extending frame bars 2, and to the rear ends of these frame bars I secure a cross bar or beam 3 having upturned ends 4. This cross bar or beam may be of wood or metal but is preferably of metal inasmuch as the end portions 4 may be easily turned up therefrom and strength will be attained without excessive weight or size. To the upturned ends 4 of this cross bar or beam, I secure the lower ends of standards 5 which rest upon the beam 3 and are formed at their upper ends with sleeves or collars 6 constituting bearings for the journals or trunnions 7 at the ends of a rocking bar or rake head. The rocking bar or rake head is illustrated in the accompanying drawing as consisting of a top plate 8, a back plate 9 depending from the rear edge of the top plate and end plates 10 depending from the ends of the top plate and formed integral therewith and with the ends of the back plate, the trunnions 7 being formed on or secured to the said end plates, as will be readily understood. Vertical slots 11 are formed in the back plate 9 at intervals through the length of the same, and alined with the respective slots, series of openings are formed through the top plate 8. Rake teeth 12 are employed, and these rake teeth may conveniently be formed of light rods presenting short straight shanks 13 disposed against the under side of the top plate 8 of the rake head, hook bolts 14 being engaged around said shanks and through the front openings 15 of the series of openings in the plate 8. The rear extremities of the shanks are turned sharply upward, as at 16, and fitted in the respective alined rear openings 17 of the series of openings in the top plate 8. From the shanks 13, the teeth extend forwardly downwardly and rearwardly to define spring return bends or coils 18 and then extend through the respective slots 11 in a slightly upward direction, as shown at 19. The teeth then curve downwardly and forwardly to ride upon the ground in the usual manner. To the under side of the cross bar or beam 3, I secure clearer pins 20 which extend rearwardly from the cross bar between adjacent rake teeth so that, when the rake teeth are raised to discharge a gathered load, they will move relatively across the pins and the load will be prevented from following the teeth and will be positively released from the teeth by the pins. It is desirable to have the teeth so related as to describe an arc transversely of the machine in order that the gathered vines may be directed toward the longitudinal center of the machine and, therefore, more quickly gathered into a bundle. This arrangement of the teeth is very easily attained by making the teeth of different lengths with the longest teeth at the center of the series, as shown in Fig. 2.

It is sometimes preferred to dump the bundles or shocks at the side of the row, and to meet this preference I may provide the teeth in a series uniformly increasing in length from one side of the rake to the opposite side, as shown in Fig. 5. In this form of the invention, the vines will be shifted or rolled toward that side of the machine carrying the longest teeth, and, to retain the vines until a bundle of the desired size has been formed, I secure to the outside tooth a keeper or guard plate 21 of any preferred form and dimensions.

Fulcrumed upon one of the frame bars 2 at a point where it may be easily reached from the driver's seat is a hand lever 22 equipped with a latch 23 to cooperate with a locking segment 24 secured upon the frame bar, and a link 25 is pivoted to and extends rearwardly from the said lever so as to operatively connect the same with an arm 26 secured rigidly to and rising from the rocking member or rake head. When a load has been gathered and it is desired to dump the same, the hand lever is swung forwardly, as indicated by the dotted lines in Fig. 1, thereby exerting a pull upon the arm 26 so that the rake head will be rocked upon its trunnions 7 and the rake teeth raised to discharge and clear the gathered load.

As indicated by the dotted lines in Fig. 2, my attachment is arranged to travel directly in rear of the knives of the harvester and the ends of the rake teeth will engage under the severed vines which are left lying upon the ground so as to gather the same and direct them toward the center of the machine and form them into a bundle as the travel of the machine continues and the quantity of gathered vines accumulates. My device is exceedingly simple in the construction and arrangement of its parts and may be mounted upon any harvester at a low cost. The forward ends of the rake teeth may be easily fitted through the vertical slots and the openings in the rocking rake head and quickly adjusted to the proper position. Should any one tooth be broken, it may be removed and a new tooth substituted therefor without removing any of the other teeth or dismantling the machine. The coils or spring bends at the forward ends of the rake teeth act to hold the gathering ends of the teeth to the ground while, at the same time, should a large rock or a buried root be encountered, the tooth or teeth engaging such obstruction will be permitted to move upwardly so as to clear the obstruction without releasing any of the other teeth from the vines. When the obstruction has been passed, the resilient or spring action of the coil will at once return the tooth to its working position.

Having thus described the invention, I claim:

An attachment for bean harvesters comprising a rake head consisting of a top plate, a back plate and depending end plates at the ends of the top and back plates, trunnions projecting from the said end plates, means for rotatably supporting the trunnions, the back plate of the rake head having vertical slots therethrough and the top of the rake head being provided with series of openings in alinement with the respective slots, rake teeth having spring coils at their front ends and extending from the lower sides of the coils through the vertical slots in the back plate of the rake head and further having shanks extending rearwardly from the upper sides of the coils immediately beneath the top plate of the rake head and provided with upstanding terminals fitting in the rear openings of the series of openings in the top of the rake head, and hook bolts engaged around the shanks immediately adjacent the coils and secured in the front openings of the series of openings in the top of the rake head.

In testimony whereof I affix my signature.

PHILIP PROPER. [L. S.]